US010642611B2

(12) United States Patent
Bhattacharyya et al.

(10) Patent No.: US 10,642,611 B2
(45) Date of Patent: May 5, 2020

(54) AGILE ESTIMATION

(71) Applicant: TATA CONSULTANCY SERVICES LIMITED, Mumbai (IN)

(72) Inventors: Pranabendu Bhattacharyya, Kolkata (IN); Sharmila Das, Kolkata (IN); Sayantan Roy, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 485 days.

(21) Appl. No.: 14/489,112

(22) Filed: Sep. 17, 2014

(65) Prior Publication Data

US 2016/0077832 A1    Mar. 17, 2016

(51) Int. Cl.
  *G06F 8/77*    (2018.01)
  *G06Q 10/06*   (2012.01)

(52) U.S. Cl.
  CPC .............. *G06F 8/77* (2013.01); *G06Q 10/06* (2013.01); *G06Q 10/06311* (2013.01)

(58) Field of Classification Search
  CPC ....... G06F 8/77; G06F 10/06311; G06F 10/06
  See application file for complete search history.

(56) References Cited

U.S. PATENT DOCUMENTS

| 8,332,251 B1* | 12/2012 | Morris ............... G06Q 10/06 705/7.22 |
| 2007/0168918 A1* | 7/2007 | Metherall ............ G06Q 10/06 717/101 |
| 2008/0092120 A1* | 4/2008 | Udupa ................ G06F 11/3696 717/124 |
| 2008/0313110 A1* | 12/2008 | Kreamer ............... G06Q 10/06 706/12 |
| 2011/0191746 A1* | 8/2011 | Packbier ................ G06F 9/44 717/103 |
| 2014/0053127 A1* | 2/2014 | Madison ................ G06F 8/30 717/103 |

OTHER PUBLICATIONS

Shilpa Bahlerao et al., "Generalized agile estimation method," Proceeding of the International Conference on Advanced Science, Engineering and Information Technology 2011, Jan. 14-15, 2011, pp. 262 - 267.
Rashmi Popli et al., "An Agile Software Estimation Technique based on Regression Testing Efforts," 13th Annual International Software Testing Conference in India, Dec. 4-5, 2013, 9 pages.

* cited by examiner

*Primary Examiner* — Lewis A Bullock, Jr.
*Assistant Examiner* — Mohammad H Kabir
(74) *Attorney, Agent, or Firm* — Seed Intellectual Property Law Group LLP

(57) ABSTRACT

The present subject matter relates to size estimation of a plurality of user stories for agile software development. The plurality of user stories associated with a software may be obtained, and a base size for each of the plurality of user stories may be computed based on at least one basic parameter. The at least one basic parameter is indicative of a parameter affecting complexity associated with execution of a user story. Subsequently, an additional size for the plurality of user stories may be ascertained, based on at least one additional parameter. The at least one additional parameter is indicative of an environmental factor affecting delivery of the software. The overall size of the plurality of user stories is determined by consolidating the base size for each user story with the additional size for the plurality of user stories.

15 Claims, 2 Drawing Sheets

AGILE ESTIMATION

TECHNICAL FIELD

The present subject matter, in general, relates to agile software development and, in particular, to a system and a method for estimating size of user stories for agile software development.

BACKGROUND

Recently, owing to the widespread popularity, agile software development has been recognized as a software engineering technology. As is generally known, agile software development refers to a collection of software development methodologies based on iterative and incremental development, where requirements and solutions evolve through collaboration between self-organizing cross-functional teams. Usually, in an attempt to ensure success for a project, organizations may utilize estimation techniques in agile environment. Estimation techniques may be understood as techniques utilized for determination of cost, efforts, and time taken for completion of a software project. An accurate estimation may assist in driving a project towards the path of success.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
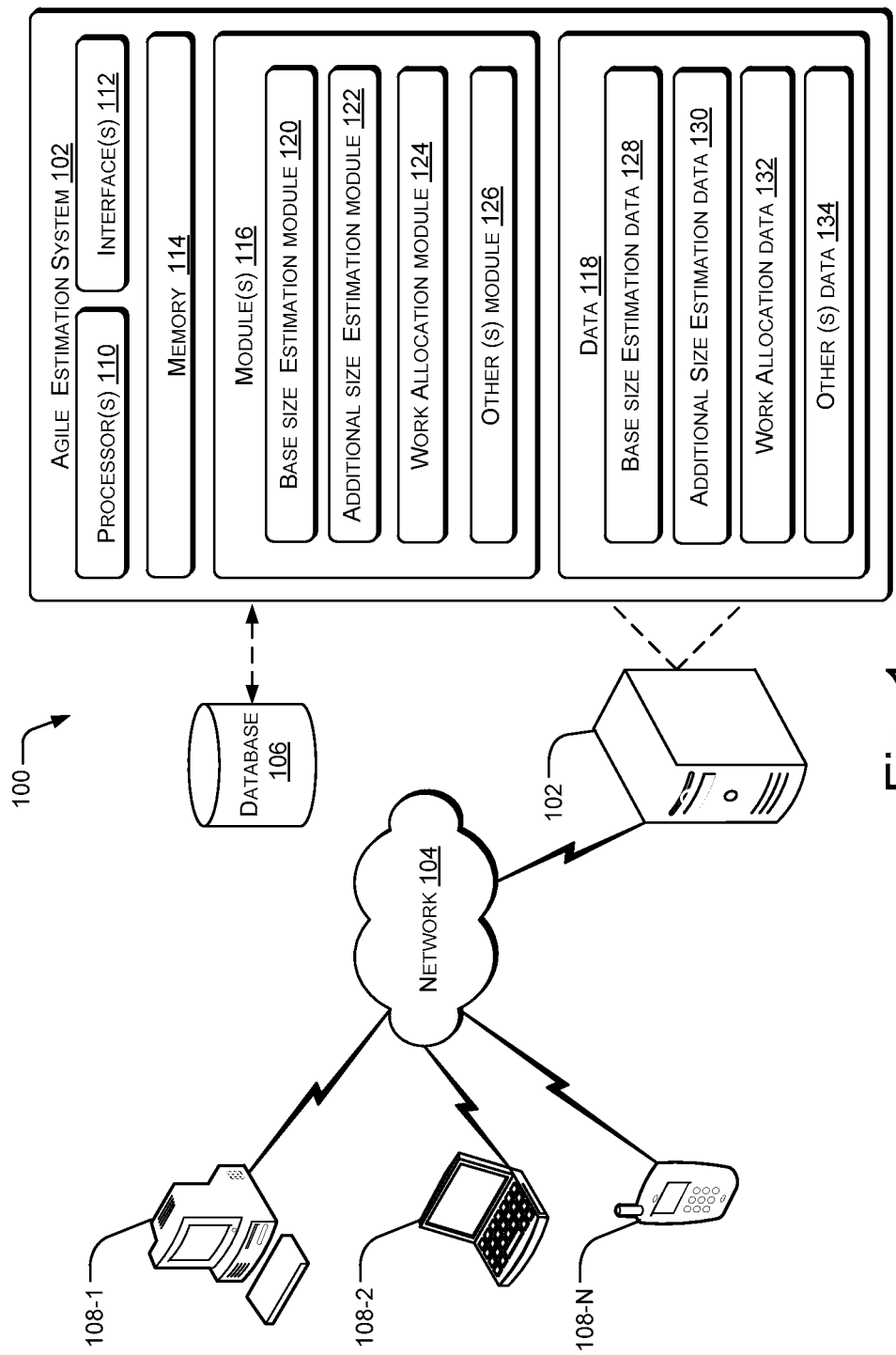
FIG. 1 illustrates a network environment implementing an agile estimation system, in accordance with an embodiment of the present subject matter.

System(s) and method(s) for size estimation of a plurality of user stories for agile software development are described. The system(s) and method(s) can be implemented in a variety of computing devices, such as laptops, desktops, workstations, tablets, portable computers, and similar systems. However, a person skilled in the art will comprehend that the embodiments of the present subject matter are not limited to any particular computing system, architecture, or application device, as they may be adapted to new computing systems and platforms as they become available.

Agile software methodologies are widely used in industries which deal with software projects that exhibit a volatile and flexible nature. For example, in the realm of Information Technology (IT), organizations usually work on multiple software projects simultaneously. Success of such software projects may assist in carving a path of growth and development for an organization. Therefore, organizations invest huge resources in order to ensure success of such software projects.

Nowadays, organizations have started opting for estimation techniques for agile software development. Estimation techniques can be understood as techniques for estimating cost, time, and efforts to be invested in a software project. Estimating such crucial aspects of software projects assists in an effective planning for execution of the software projects which, in turn, would improve the possibility of their success. On the other hand, negligence towards estimation may lead to improper utilization of capital, faulty end products, delay in delivery of end products, and poor quality. In order to ensure an accurate estimation for a software project, it becomes relevant to understand the complexity associated with the software project.

In one example, for determining the complexity associated with a software project, the software project can be disintegrated into one or more features with each feature being indicative of a portion of functionality that delivers business value. A feature is indicative of an addition to, or a change to, existing functionalities of the software project. Each feature can further be broken down into a collection of related user stories with each user story defining a particular functionality. A user story can be understood as a statement reflecting expectations of a user from a feature of a software associated with the software project, and is generally written from the perspective of the user.

Conventionally, there are techniques, such as planning poker, being utilized for size estimation of the user stories associated with a software of the software project. A size of a user story can be understood as a quantitative measure of complexity associated with the execution of the user story. In planning poker sessions, multiple analysts sit together for estimating size of user stories. In one example, the analysts may include, but are not limited to, programmers, testers, database engineers, user interaction designers, and product owners or clients of the product. The analysts may allocate a story point to a user story, based on the complexity of the user story. In one example, the analysts may select a scale of 1-10 for allocating the story points to user stories, with 1 being indicative of minimum complexity and 10 being indicative of maximum complexity. In another example, the analysts may select the Fibonacci series as a scale for estimating size of a user story. Therefore, each of the analysts may select a story point, from the Fibonacci series, i.e., 1, 2, 3, 5, 8, 13, 21, 34 . . . , for being allocated to a user story. Once the story points are allocated to a user story, the analysts may discuss the allocated story points to arrive at an agreed-upon final size of the user story.

As would be understood, each analyst may estimate the size of a user story by allocating appropriate story points based on his/her understanding and skill-set. Further, different analysts may have a varying skill set for estimating size of a user story, and therefore, the size estimation may become person-dependent. In fact, the estimation may worsen when there are multiple teams estimating size of a user story. In such a case, different teams may estimate different size for same user story, based on varying skill-set and understanding of the respective participants. This would also make it difficult to compare the size of user stories across different sprints and different projects as the conventional estimation techniques are not standardized. Therefore, there is a lack of standardization in terms of factors to be considered for estimation of the size of a user story. Due to unavailability of the standardization, the variation among the story points allotted by the analysts could be significant. This would lead to lengthy and complicated discussions in order to arrive at a final size of the user story.

Further, the outcome of size estimation of user stories may then be utilized for estimation of cost, time, and efforts associated with the software project. Consequently, inaccuracy in the size estimation would directly reflect in the estimation of the cost, time, and efforts. Therefore, the accuracy of the whole process of estimation for software projects is compromised.

In one example, a sprint velocity can also be determined based on the size of user stories. A sprint velocity of a team can be understood as a number of story points that can be delivered by the team in a fixed duration of time. The fixed duration of time is referred to as a sprint. Sprint velocities among various teams can then be utilized to determine and compare the performance and efficiency of the teams. However, an inaccurate estimation of the size of the user stories may lead to an inaccurate determination of the sprint velocities as well.

Thus, as would be gathered, the conventional techniques of size estimation are highly person-dependent and lack standardization. The lack of standardization would lead to inaccurate size estimation and thereafter, errors in effort estimation, cost estimation, time estimation, and determination of sprint velocities. The inaccuracy would, in turn, directly affect the planning of the software projects. This would also result into inconvenience in agile software development. Therefore, the conventional techniques offer a fragmented, person-dependent, inconvenient, time-extensive, and expensive estimation for software projects in agile environment.

According to the present subject matter, a system and a method for size estimation of a plurality of user stories for agile software development is disclosed. In one implementation, the plurality of user stories associated with a software may be obtained for size estimation analysis. The software is associated with a software project. For each user story, a base size may be computed based on at least one basic parameter. Following the computation of the base size, an additional size for the plurality of user stories may be ascertained based on at least one additional parameter. Subsequently, an overall size of the plurality of user stories may be determined by consolidating the base size for each user story and the additional size for the plurality of user stories. According to the present subject matter, the size estimation is done through a parametric analysis of the user stories. This enables standardization of size estimation for user stories, and subsequently of estimation of cost, time, and efforts for the software development. The standardization leads to minimization of person dependency in the various estimations, as described herein.

In an implementation, once the plurality of user stories may be obtained, a base size may be computed for each of the plurality of user stories, based on the at least one basic parameter. The at least one basic parameter is indicative of a parameter affecting complexity associated with execution of a user story. In one example, the at least one basic parameter may include, but is not limited to, business rules, code refactoring, regression, design change, deployment management change, number of entities manipulated, primary data manipulation type, database trips, number of interfaces, performance, security, usability, and reliability. Therefore, the base size of a user story can be understood as a quantitative measure of complexity associated with execution of the user story with regard to the at least one basic parameter.

Further, an additional size may be ascertained for the plurality of user stories based on at least one additional parameter. The at least one additional parameter is indicative of an environmental factor affecting delivery of an end product, i.e., the software. In one example, the at least one additional parameter may include, but is not limited to, roadmap clarity, product backlog management, reporting requirements, external dependencies, large data handling, third party component usage, new technology, sprint duration strictness, research items, and configurations. The additional size of the user stories can be understood as a quantitative measure of complexity associated with delivery of the end product, i.e., the software, which directly or indirectly impacts the execution of the user stories.

The ascertaining of the additional size may further include determining, against each additional parameter, whether the impact of the respective additional parameter is story-specific or sprint-specific. Subsequently, based on the determination, an intermediate additional size for the plurality of user stories may be determined against each additional parameter. The intermediate additional size is determined depending on whether the impact of the respective additional parameter is story-specific or sprint-specific. Following this determining, the additional size for the plurality of user stories may be computed based on intermediate additional size determined against each additional parameter.

In continuation with the computation of the base size and the additional size, an overall size of the plurality of user stories may be determined by consolidating the base size for each user story and the additional size for the plurality of user stories.

In one implementation, the overall base size of the plurality of user stories along with a pre-baselined delivery rate may be utilized for ascertaining a consolidated effort for execution of the plurality of user stories. The pre-baselined delivery rate is indicative of capability of a team for execution of a user story. Further, a total capacity of the team for a pre-defined sprint may be determined based on a number of members in the team and working hours of each member. Based on the consolidated effort and the total capacity, the plurality of stories may be allocated to the team for execution.

As would be gathered, the present subject matter offers a predefined set of parameters, namely, basic parameters and additional parameters, for size estimation of the user stories for agile software development. The basic parameters and the additional parameters provide a set of parameters that can affect the progress of software development. Therefore, the present subject matter offers a standardized technique for estimation of size for the user stories and subsequent determination of the sprint velocities of teams involved in the development of a software. As a result, even when there are multiple teams for estimating the size of a user story, the size estimated for the user story would be same due to the consideration of same set of parameters being provided to the teams. Further, the size of user stories across sprints and software projects can also be compared and analyzed as the size estimation technique is standardized. This enables in benchmarking of size of user stories and sprint velocities across sprints and software projects. Also, person dependency in the estimation has been reduced to minimum. This would assist in eliminating the possibility of errors due to varying skill set of analysts. Further, owing to the standardized technique of size estimation, the present subject matter facilitates participants of a planning poker session to conveniently converge and agree on a final size of a user story. In addition, determination of additional size of the user stories based on a story-specific impact and a sprint-specific impact facilitates a comprehensive and accurate computation of an overall size of the user stories. Therefore, the system and the method allow a standardized, accurate, effective, comprehensive, and convenient approach for estimation in agile software development.

These and other advantages of the present subject matter would be described in greater detail in conjunction with the following figures. While aspects of described system(s) and method(s) for size estimation of plurality of user stories for agile software development can be implemented in any number of different computing systems, environments, and/or configurations, the embodiments are described in the context of the following exemplary system(s).

FIG. 1 illustrates a network environment 100 implementing an agile estimation system 102, also referred to as system 102, according to an embodiment of the present subject matter. In the network environment 100, the system 102 is connected to a network 104. Further, the system 102 is connected to a database 106. Additionally, the network environment 100 includes one or more user devices 108-1, 108-2 . . . 108-N, collectively referred to as user devices 108 and individually referred to as user device 108, connected to the network 104.

The system 102 can be implemented as a computing device connected to the network 104. For instance, the system 102 may be implemented as workstations, personal computers, desktop computers, multiprocessor systems, laptops, network computers, minicomputers, servers, and the like. In addition, the system 102 may include multiple servers to perform mirrored tasks for users.

Furthermore, the system 102 can be connected to the user devices 108 through the network 104. Examples of the user devices 108 include, but are not limited to personal computers, desktop computers, smart phones, PDAs, and laptops. Communication links between the user devices 108 and the system 102 are enabled through various forms of connections, for example, via dial-up modem connections, cable links, digital subscriber lines (DSL), wireless or satellite links, or any other suitable form of communication.

Moreover, the network 104 may be a wireless network, a wired network, or a combination thereof. The network 104 can also be an individual network or a collection of many such individual networks interconnected with each other and functioning as a single large network, e.g., the internet or an intranet. The network 104 can be implemented as one of the different types of networks, such as intranet, local area network (LAN), wide area network (WAN), the internet, and such. The network 104 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. Further, the network 104 may include network devices, such as network switches, hubs, routers, host bus adapters (HBAs), for providing a link between the system 102 and the user devices 108. The network devices within the network 104 may interact with the system 102 and the user devices 108 through communication links.

In said embodiment, the system 102 includes one or more processor(s) 110, interface(s) 112, and a memory 114 coupled to the processor 110. The processor 110 can be a single processing unit or a number of units, all of which could also include multiple computing units. The processor 110 may be implemented as one or more microprocessors, microcomputers, microcontrollers, digital signal processors, central processing units, state machines, logic circuitries, and/or any devices that manipulate signals based on operational instructions. Among other capabilities, the processor 110 is configured to fetch and execute computer-readable instructions and data stored in the memory 114.

The interfaces 112 may include a variety of software and hardware interfaces, for example, interface for peripheral device(s), such as a keyboard, a mouse, an external memory, and a printer. Further, the interfaces 112 may enable the system 102 to communicate with other computing devices, such as web servers, and external data repositories, such as the database 106, in the network environment 100. The interfaces 112 may facilitate multiple communications within a wide variety of protocols and networks, such as a network 104, including wired networks, e.g., LAN, cable, etc., and wireless networks, e.g., WLAN, cellular, satellite, etc. The interfaces 112 may include one or more ports for connecting the system 102 to a number of computing devices.

The memory 114 may include any non-transitory computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The non-transitory computer-readable medium, however, excludes a transitory, propagating signal.

The system 102 also includes module(s) 116 and data 118. The module(s) 116 include routines, programs, objects, components, data structures, etc., which perform particular tasks or implement particular abstract data types. In one implementation, the module(s) 116 includes a base size estimation module 120, an additional size estimation module 122, a work allocation module 124, and other module(s) 126. The other module(s) 126 may include programs or coded instructions that supplement applications and functions of the system 102.

On the other hand, the data 118 inter alia serves as a repository for storing data processed, received, and generated by one or more of the module(s) 116. The data 118 includes, for example, base size estimation data 128, additional size estimation data 130, work allocation data 132, and other data 134. The other data 132 includes data generated as a result of the execution of one or more modules in the module(s) 116.

In one implementation, the base size estimation module 120 may obtain a plurality of user stories associated with a software. Once the plurality of user stories are obtained, the base size estimation module 120 may compute a base size for each of the plurality of user stories based on at least one basic parameter. The at least one basic parameter is indicative of a parameter affecting complexity associated with execution of a user story. Therefore, the base size can be understood as a quantitative measure of complexity associated with execution of a user story, with regard to the at least one basic parameter.

In one implementation, the at least one basic parameter can further be categorized as functional parameters and non-functional parameters. A functional parameter is indicative of a parameter affecting functionalities of a software, which are availed by an end-user. For example, the functional parameters may include, but are not limited to business rules, code refactoring, regression, design change, deployment management change, number of entities manipulated, primary data manipulation type, database trips, and number of interfaces. On the other hand, a non-functional parameter can be understood as a parameter pertaining to operation of the software, and is not related to functionalities availed by the end-user. In one example, the non-functional parameters may include, but are not limited to performance, security, usability, and reliability.

For computing the base size for a user story, the base size estimation module 120, for each basic parameter, may provide a plurality of options to a user. In one example, a user may include, but is not limited to a programmer, a tester, a database engineer, and a user interaction designer. The user may utilize a user device 108 for availing the functionalities offered by the system 102. Further, the plurality of options for a basic parameter may be understood as choices to be opted for a user story, with respect to the basic parameter. In one implementation, the plurality of options may vary for different basic parameters. For example, the basic parameter "Business rules" is indicative of a number of business rules in a user story, and the plurality of corresponding options may include, but are not limited to, "1", "2-3", ">3". Similarly, the basic parameter "Code Refactoring" is indicative of an amount of code refactoring to be performed for a user story, and the plurality of corresponding options may include, but are not limited to, "No change in existing code", "Few lines of code change in existing code", "More lines of code change in existing code", and "Complete code refactoring".

Table 1 illustrates examples of basic parameters, description of each of the basic parameters, and corresponding options to be provided to the user for computation of base size for a user story. Table 1 is provided for providing more clarity and understanding of the present subject matter, and therefore, should not be construed as limiting.

TABLE 1

| Type of Basic Parameters | Basic Parameter | Options (List of Values) | Parameter Description |
|---|---|---|---|
| Functional Parameters | Business Rules | 1 Rule<br>2-3 Rule<br>>3 Rule | Number of validations/business rules in the user story |
| | Code Refactoring | No change in existing code<br>Few lines of code change in existing code.<br>More lines of code change in existing code<br>Complete refactoring of existing code. | The amount of code changes for this particular story |
| | Regression | No regression testing required for existing features<br>Some regression testing required for existing features<br>More regression testing required for existing features<br>Complete regression test cycle required | The amount of regression testing required for this story implementation |
| | Design Change | No design/architectural change<br>Design/architectural change needed | Asks whether any design/architecture change is needed as a result of this story |
| | Deployment Management Change | Not Required<br>Required | Asks whether there is a change required in the application deployment scripts/build scripts and overall management of the same because of this story |
| | No. of entities manipulated | 1 entity<br>2-3 entities<br>>3 entities | How many tables or logical storage entities does this story update/read/insert? |
| | Primary Data Manipulation Type | Read<br>Create<br>Delete<br>Update | This is the database transaction type (read/delete/update/delete) of the major functionality in this story (considers the primary intent of functionality in case of multiple transactions) |
| | Database Trips | Only Once<br>Less than or equal to 2<br>Less than or equal to 4<br>5 or more | Complete end to end trip to and from Database, e.g., just a save transaction is 1 transaction. Capturing the parameters and fetching the details accordingly from DB are 2 transactions. |

TABLE 1-continued

| Type of Basic Parameters | Basic Parameter | Options (List of Values) | Parameter Description |
|---|---|---|---|
| | No. of Interfaces/Mid-tier | 1<br>2 to 3<br>More than 3 | This is the no. of third party interfaces, mid-tier, data exchange queues involved in this user story implementation, if the same are getting changed or developed. |
| Non Functional Parameters | Performance | NA<br>Low<br>Medium<br>High | Are you doing anything additional in this story implementation which will take care of performance issues? |
| | Security | NA<br>Low<br>Medium<br>High | Are you doing anything additional in this story implementation which will take care of security issues? |
| | Usability | NA<br>Low<br>Medium<br>High | Are you doing anything additional in this story implementation which will take care of usability issues? |
| | Reliability | NA<br>Low<br>Medium<br>High | Are you doing anything additional in this story implementation which will take care of reliability issues? |

As shown in Table 1, the base size estimation module 120 may provide the user with the at least one basic parameter and the corresponding plurality of options. In one implementation, the base size estimation module 120 may fetch the at least one basic parameter and corresponding details from the database 106. In response to each basic parameter and the corresponding plurality of options, the base size estimation module 120 may receive an input being indicative of user's selection, with regard to each basic parameter. Based on the inputs received, the base size estimation module 120 may allocate a score to the user story against each basic parameter. In one implementation, a score may be a numerical value and is indicative of complexity associated with a user story against a parameter. The score may be predefined for each option against each basic parameter. Thus, the predefined score corresponding to the user selected option for the respective basic parameter is allocated to the user story. In one example, the predefined scores may be on a scale of 0-10 for the options for the basic parameters.

Following the allocation of story points for each basic parameter, the base size estimation module 120 may determine an intermediate base size of each user story, by adding the predefined scores for the basic parameters for the respective user story. The base size estimation module 120 may further determine the base size for the user story as an integer in a Fibonacci series which is closer to the intermediate base size. As is generally known, the Fibonacci series is indicative of a series of integers, i.e., "1, 2, 3, 5, 8, 13, 21, 34 . . . ".

To explain this through an example for a user story, the base size estimation module 120 may receive inputs being indicative of user's selection as the option "1 Rule" for the basic parameter "Business Rules", the option "Complete refactoring of existing code" for the basic parameter "Code Refactoring", the option ">3" for the basic parameter "Number of entities manipulated", and the option "Less than or equal to 2" for the basic parameter "Database trips". Accordingly, the base size estimation module 120 may allocate predefined scores "1", "2", "2", and "0.5", respectively, to the user story. The base size estimation module 120 may then add the allocated scores to determine the intermediate base size as "5.5". As mentioned previously, in order to compute the base size of a user story, the base size estimation module 120 may utilize the Fibonacci series. In this, the base size estimation module 120 may identify an integer in the Fibonacci series, which is closest to the intermediate base size, and accordingly determine the base size as the identified integer. For the example described herein, the base size estimation module 120 may identify "5" as the integer in the Fibonacci series which is closest to the intermediate base size of "5.5". With this, the base size estimation module 120 may determine the base size as "5".

In one example, for the intermediate base size of "5.5", the base size estimation module 120 may determine a comfortable base size as "8" and determine a stringent base size as "5" for the user story. The stringent base size can be understood as the integer of the Fibonacci series that is closest to and smaller than the intermediate base size. Further, the comfortable base size can be understood as the integer of the Fibonacci series that is closest to and larger than the intermediate base size. In an implementation, the user can select one of the comfortable base size and the stringent based size as the base size of the user story. The user can select the comfortable base size as the base size in case the software is to be delivered in considerable time and with considerable resources. The user can select the stringent base size as the base size in case the software is to be delivered faster and with fewer resources. In such implementation, the base size estimation module 120 may receive a user input with the stringent based size or the comfortable base size to determine the base size of the user story.

Further, in an implementation, the base size estimation module 120 may select a likely base size, one from amongst the comfortable base size and the stringent base size which is closer to the intermediate base size. For the example mentioned above, the base size estimation module 120 may select the stringent base size of 5 as the likely base size for the user story.

In one implementation, the base size estimation module 120 may define a threshold value for the base sizes of the plurality of user stories. In case a base size of a user story is determined to be above the predefined threshold value, the base size estimation module 120 may provide a notification to the user. The notification may be understood as an indication of the base size of a user story being larger than the predefined threshold value and therefore, the user can consider breaking or disintegrating the user story into multiple user stories. In one implementation, the details pertaining to the base size estimation module 120 may be stored in the base size estimation data 128.

Following the computation of the base size for each of the plurality of user stories, the additional size estimation module 122 may ascertain an additional size for the plurality of user stories based on at least one additional parameter. An additional parameter is indicative of an environmental factor affecting delivery of an end product, i.e., the software. Therefore, the additional size of the plurality of user stories can be understood as a quantitative measure of complexity associated with delivery of the end product, i.e., the software, which directly or indirectly impacts the execution of the user stories. In one implementation, the value of the additional size may be positive, or negative, or zero.

In one example, the at least one additional parameter may include, but is not limited to, roadmap clarity, product backlog management, reporting requirements, external dependencies, large data handling, third party component usage, new technology, sprint duration strictness, research items, and configurations. Table 2 illustrates an example of additional parameters and description of each of the additional parameters for computation of additional size for a user story. Table 2 is provided for providing more clarity and understanding of the present subject matter, and therefore, should not be construed as limiting. In one implementation, the additional size estimation module 122 may fetch the at least one additional parameter and corresponding details from the database 106.

TABLE 2

| Sr. no. | Additional Factors | Description |
|---|---|---|
| 1 | Roadmap Clarity | Absence (or sufficient presence) of story execution details. If business/technological strategy is not clear then it may impact sprint delivery. |
| 2 | Product Backlog Management | Creating and maintaining an agile product backlog wherein the incoming stories are managed and outgoing stories are picked up for execution. |
| 3 | Coordination/Integration (Distributed Scrum) | Additional coordination or integration required in case of non co-located (distributed) agile teams or otherwise. |
| 4 | Overall Infrastructure Upgradation | Impact due to activities like upgradation of tools, system or network upgradation, maintenance, etc. |
| 5 | Reporting Requirements | Additional status reporting requirements from the customer on top of normal sprint end reports. |
| 6 | External Dependencies | Dependency on entities (teams and individuals or resources) other than the Sprint Team which impacts the effort and the timeline of delivery. |
| 7 | Absence of SME | Impact due to absence or presence of a subject matter expert in the team. |
| 8 | Large Data Handling | Impact due to management of large volume of customer data, which is beyond the normal scale of expected data. |
| 9 | Third Party Component Usage | Impact due to usage of any Third Party component, where in the sprint team's full control may be absent. |
| 10 | Business Experience | Impact due to high or low business experience of team |
| 11 | New Technology/Tool | Impact if Technology/Tool to be used is new to the team, or the team is not sufficiently experienced in the tools/technologies to be used. |
| 12 | Absence of Tools/Processes | Impact due to absence of proper automation (leading to manual work) or streamlined processes that helps in delivery. |
| 13 | Volatile Requirement | Impact due to very frequently changing customer requirements |
| 14 | Overall Regression Testing | Impact due to testing of entire application at a sprint level for all the changes done in that sprint |
| 15 | Overall Design Change | Impact due to any design change of entire application which is not related to any particular story of that sprint. |
| 16 | Leveraging Reusable components (E.g. Minor Enhancements, Automation Framework) | In case of minor enhancements or presence of automation framework, existing components are reused, which impacts the delivery. |
| 17 | Sprint Duration Strictness (lesser duration means higher points) | In case of short sprint durations (ex: 1 week) teams have to work under tremendous time pressure, which impacts the delivery. |

TABLE 2-continued

| Sr. no. | Additional Factors | Description |
| --- | --- | --- |
| 18 | Additional Business Analysis | Impact for any additional Business Analysis to perform beyond the normal analysis required. |
| 19 | Documentation and other Non-Code Deliverables | Impact due to deliverables other than the developed stories which are a part of the requirement (ex: test scripts). |
| 20 | Additional Reviews/Reporting | Internal reviews and reporting required which is above average for ensuring quality of deliverables. |
| 21 | Multiple Builds | Multiple application builds (more than the average of 1 or 2) required within a sprint based on specific customer need, impacting delivery. |
| 22 | Research Items | Information discovery and analysis required for a business requirement, which is not directly connected to developing a current story. |
| 23 | Configurations (Version upgradation, setup, etc) | Activities like development environment setup, version upgradation of existing tools, tool configuration, etc |

For ascertaining the additional size for the plurality of user stories, the additional size estimation module 122 may provide to the user a plurality of options against each additional parameter in order to determine whether the impact of the respective additional parameter is sprint-specific or story-specific. The plurality of options may include, but are not limited to, "Sprint-specific" and "Story-specific". In one implementation, the additional size estimation module 122 may receive an input, from the user, being indicative of selection of the option "Sprint-specific" or "Story-specific". The selection of the option "Sprint-specific" for an additional parameter is indicative of the additional parameter being impacting all the user stories in a specific sprint. The selection of the option "Story-specific" for an additional parameter is indicative of the additional parameter being impacting some user stories, known to the user, of a specific sprint, or impacting a percentage of user stories, known to the user, of a specific sprint.

In the implementation where the option "Sprint-specific" is selected by the user for an additional parameter, the additional size estimation module 122 may determine whether the additional parameter is going to increase or decrease a total base size of the user stories. For doing so, the additional size estimation module 122 may provide a couple of options to the user, which may include, but are not limited to, "Increase the total base size" and "Decrease the total base size". In continuation with receipt of an input indicative of selection of one of the couple of options, the additional size estimation module 122 may further provide the user with a plurality of options for receiving from the user a score by which the total base size of the user stories is to be updated with regard to the additional parameter. This score may be in the form of a number of story points by which the total base size of the user stories is to be updated. Based on the user input for the score, the additional size estimation module 122 may determine the received score as the intermediate additional size of the user stories against the additional parameter.

In the implementation where the option "Story-specific" is selected by the user for an additional parameter, the additional size estimation module 122 may determine whether some user stories or a percentage of user stories, known to the user, being impacted by the additional parameter. For this, the additional size estimation module 122 may provide options to the user to select one of, for example, "Impacting some known user stories" and "Impacting a known percentage of user stories." If the user input of "Impacting some known user stories" is received, then the additional size estimation module may receive a user input indicative of known user stories that are impacted by the additional parameter. The known user stories are from amongst the plurality of user stories. After receiving this user input for the known user stories, the additional size estimation module 122 may compute a score by which the base size for each known user story is to be updated. This score is computed based on a number of steps in Fibonacci series by which the base size of one known user story is updated. The additional size estimation module 122 may then determine the intermediate additional size for the user stories against the additional parameter based on the computed score for the each known user story.

On the other hand, if the user input of "Impacting a known percentage of user stories" is received, then the additional size estimation module 122 may provide the user with a plurality of options to determine a percentage of user stories to be impacted by the additional parameter. In one implementation, the plurality of options may include, but are not limited to, 10%, 20%, 40%, 60%, and 80%. Once the additional size estimation module 122 receives an input being indicative of the percentage of user stories to be impacted, the additional size estimation module 122 may then compute a score by which the total base size of the user stories has to be decreased or increased. This score is computed based on the percentage of user stories to be impacted and a number of steps in Fibonacci series by which the base size of one user story is updated. The additional size estimation module 122 may then determine the intermediate additional size of the user stories based on the computed score.

The above described procedures may be repeated for each additional parameter that has a "Story-specific" impact or the "Sprint-specific" impact to determine the intermediate additional size against each of the additional parameters. The intermediate additional size determined against each additional parameter may then be added to compute the additional size for the plurality of user stories.

To describe an example of determination of intermediate additional size of the user stories with respect to an additional parameter "Roadmap clarity" when the option "Sprint-specific" is selected, consider a case where the base size estimation module 120 computes a total base size for 10 user stories as 110. The additional size estimation module 122 may receive an input indicative of selection of the option "Sprint-specific", from the user, with regard to the additional parameter "Roadmap clarity". Subsequently, the additional size estimation module 122 may receive a user input being indicative of "Increase the total base size" with respect to "Roadmap clarity." Subsequently, the additional size estimation module 122 may receive a user input being indicative of a score of 8 story points to be added to the total base size for the user stories. The additional size estimation module 122 may determine the score of 8 story points as the intermediate additional size for the user stories against "Roadmap clarity."

To describe an example of determination of intermediate additional size of the user stories with respect to an additional parameter "Roadmap clarity" when the option "Story-specific" is selected, consider a case where the base size estimation module 120 determines base sizes for 10 user stories, and determines a total base size of 10 user stories as 110. Continuing with the present example, the additional size estimation module 122 may receive a user input indicative of selection of the option "Impacting some known user stories" or "Impacting a known percentage of user stories", with regard to the additional parameter "Roadmap clarity". If the user input is for "Impacting some known user stories", the additional size estimation module 122 may receive a user input for the known user stories, from amongst the plurality of user stories that are impacted by "Roadmap clarity". In an example, the user input may indicate that user story 1, user story 4, and user story 6 are impacted by "Roadmap clarity". Let's say the base size for user story 1 is 5, for user story 4 is 8, and for user story 6 is 13. After receiving the user input for the known user stories, the additional size estimation module 122 may receive a user input being indicative of increasing the base size of one known user story by 1 step in the Fibonacci series. As the base size of a known user story has to be increased by 1 step in the Fibonacci series, the base size of user story 1 is increased from 5 to 8, the base size of user story 4 is increased from 8 to 13, and the base size of user story 6 is increased from 13 to 21. Therefore, the additional size estimation module 122 may compute the score for user story 1 as 3 story points, due to increase of its base size from 5 to 8. Similarly, the additional size estimation module 122 may compute the score for user story 4 as 5 story points, due to increase of its base size from 8 to 13. Similarly, the additional size estimation module 122 may compute the score for user story 4 as 8 story points, due to increase of its base size from 13 to 21. In an example, the base size of a user story can take a maximum value of 21, and a minimum value of 0. After this, the addition size estimation module 122 adds up the computed scores for user stories 1, 4, and 6, to determine the intermediate additional size for the user stories, against "roadmap clarity", as 16 story points.

On the other hand, if the user input is for "Impacting a known percentage of user stories", the additional size estimation module 122 may receive an input, from the user, being indicative of "40%" user stories to be impacted due to the additional parameter "Roadmap clarity". Further, the additional size estimation module 122 may receive an input being indicative of increasing the base size of one user story by 1 step in the Fibonacci series. In the present example, an average story point per user story is 110/10=11 story points. As the base size for one user story has to be increased by 1 step in the Fibonacci series, the average story point per user story is increased from 11 to 13. Therefore, the base size of each of the user stories may be increased by 2 story points, with regard to the additional parameter "Roadmap clarity". Now, in light of the selection of "40%" as the percentage of user stories to be impacted, base sizes of 4 user stories, out of the 10 user stories, may be increased by 2 story points. Therefore, the additional size estimation module 122 may compute a score of 8 story points by which the total base size of the 10 user stories is increased with regard to "Roadmap clarity". The additional size estimation module 122 may thus determine the score of 8 story points as the intermediate additional size for the user stories against "Roadmap clarity."

The additional size estimation module 122 may determine the additional size for the plurality of user stories based on the intermediate additional size with respect to each additional parameter. In one implementation, details pertaining to the additional size estimation module 122 may be stored in the additional size estimation data 130.

Once the base size for each user story and the additional size for the plurality of user stories may be determined by the base size estimation module 120 and the additional size estimation module 122, respectively, the work allocation module 124 may consolidate the base size for each user story with the additional size for the plurality of user stories, in order to compute an overall size of the plurality of user stories.

In one implementation, the user may define a sprint for executing the plurality of user stories. In one implementation, the work allocation module 124 may consolidate the overall sizes of the plurality of user stories belonging to a predefined sprint, and the consolidated overall size is referred to as an estimated sprint velocity. The estimated sprint velocity may be understood as a number of story points a team can deliver in the predefined sprint.

Further, the work allocation module 124 may utilize the estimated sprint velocity along with a pre-baselined delivery rate for ascertaining a consolidated effort for execution of the plurality of user stories. The pre-baselined delivery rate may be understood as a quantitative measure of capability of a team in terms of time required for execution of a user story and can be measured in person hours per story point (PH/SP). In one example, the pre-baselined delivery rate may vary according to a technology of a user story. In one implementation, the pre-baselined delivery rate may depend on an overall size of a user story as well. For example, for a user story with an overall size of 1, the pre-baselined delivery rate may equate to 4 PH/SP. Similarly, for a user story with an overall size of 2, 3, 5, 8, 13, and 21, the pre-baselined delivery rate may equate to 5 PH/SP, 5.5 PH/SP, 6 PH/SP, 5 PH/SP, 4 PH/SP, and 3 PH/SP, respectively.

In one example, the base size estimation module 120 may determine base sizes of user stories A, B, C, and D as 3, 5, 13, and 5, respectively. Based on the pre-baselined delivery rate mentioned earlier, the work allocation module 124 may determine a base effort to be utilized for the user story A as 3*5.5=16.5 PH. Similarly, base efforts to be utilized for the user story B, C, and D may be determined as 30 PH, 52 PH, and 30 PH, respectively. Subsequently, the work allocation module 124 may determine the total base effort to be utilized for the user stories A, B, C, and D as 16.5+30+52+30=128.5 PH.

Further, for determining a total additional effort for the user stories A, B, C, and D, the total additional size of the user stories A, B, C, and D, can be assumed as 5. In the present example, the work allocation module 124 may compute an average pre-baselined delivery rate as (4+5+5.5+6+5+4+3)/7=4.6. In the present example, the work allocation module 124 may ascertain additional efforts to be utilized for the user stories A, B, C, and D as 5*4.6=23 PH. Subsequently, the work allocation module 124 may consolidate the base efforts with the additional efforts to ascertain the total effort for the user stories A, B, C, and D, which would be 128.5+23=151.5 PH in the present example.

In continuation with the ascertaining of the total effort, the work allocation module 124 may determine a total capacity of a team for a predefined sprint, based on a number of members in the team, working hours of each member, and duration of the predefined sprint. The work allocation module 124 may utilize the total effort and the total capacity for allocating the work pertaining to the plurality of user stories and therefore, pertaining to the software project. In one implementation, the work allocation module 124 may utilize the total effort and the total capacity for allocating the plurality of user stories among various teams or team members.

In one example, the work allocation module 124 may determine the total capacity of a team of 10 members, for a sprint of 20 days and with 8 working hours per day, as 20*10*8=1600 PH. However, the work allocation module 124 may determine the total efforts to be utilized as 1480 PH. In such a case, the work allocation module 124 may determine the capacity utilization as 1480/1600*100=92.5%. A capacity utilization percentage of below 100% is indicative of the team being under-utilized. On the other hand, a capacity utilization percentage of above 100% is indicative of the team being over-utilized.

In one implementation, the work allocation module 124 may compare the estimated sprint velocity with an actual sprint velocity at the end of each sprint in order to track productivity of the team. For example, if the actual sprint velocity is lesser than the estimated sprint velocity, the team is considered to be under-performing On the other hand, if the actual sprint velocity is higher than the estimated sprint velocity, the team is considered to be over-performing, i.e., better than their estimated capability.

Further, the work allocation module 124 may generate a sprint velocity report. The sprint velocity report may include, but are not limited to, an estimated sprint velocity of a team for each sprint, an actual sprint velocity of the team for each sprint, and a size variance for each sprint. The size variance is indicative of a percentage of deviation of an actual sprint velocity from a corresponding estimated sprint velocity for a sprint. Further, in one example, when a team has over-delivered, i.e., the variance is a positive value, the variance may be displayed in a green color. On the hand, when the team has under-delivered, i.e., the variance is a negative value, the variance may be displayed in a red color. In one implementation, the work allocation module 124 may generate a graph depicting the trend of an actual sprint velocity and an estimated sprint velocity over a series of sprints.

In one implementation, the sprint velocity report may provide an analysis of sprint-to-sprint estimated velocities and the actual velocities. This would assist in determining an overall progress of teams over multiple sprints. In an example, if the estimated velocity of a current sprint is more than the actual velocity of the previous sprint, then the current sprint is indicated with green color. However, if the estimated velocity of a current sprint is less than the actual velocity of the previous sprint, then the current sprint is indicated with red color. With this, it can be determined whether the productivity of the team is increasing, decreasing, or constant.

In one implementation, details pertaining to the work allocation module 124 may be stored in the work allocation data 132.

Figure 2:
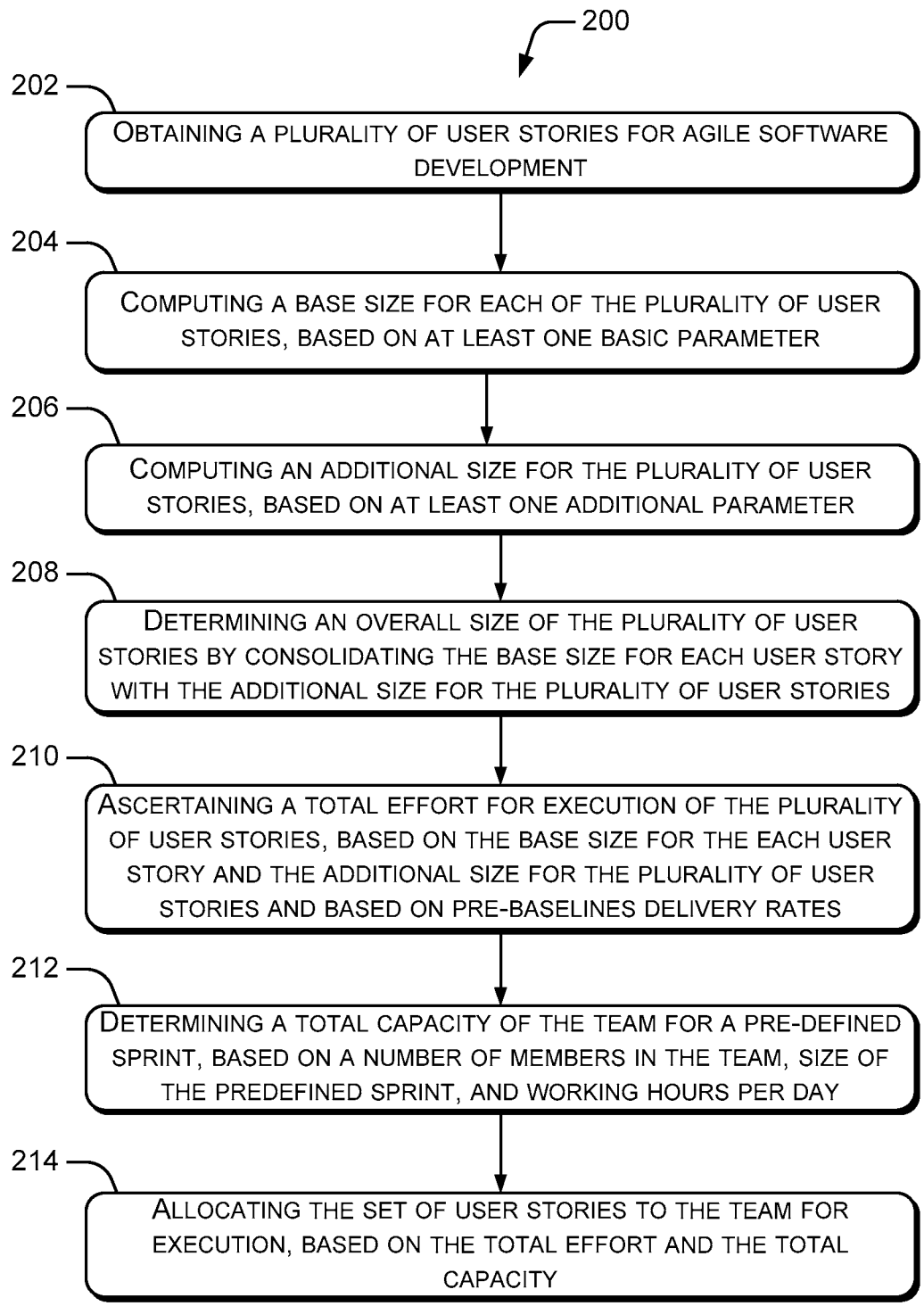
FIG. 2 illustrates a method for size estimation of a plurality of user stories for agile software development, in accordance with an embodiment of the present subject matter.

FIG. 2 illustrates a method 200 for size estimation of a plurality of user stories for agile software development, according to one embodiment of the present subject matter. The method 200 may be implemented in a variety of computing systems in several different ways. For example, the method 200, described herein, may be implemented using an agile estimation system 102, as described above.

The method 200, completely or partially, may be described in the general context of computer executable instructions. Generally, computer executable instructions can include routines, programs, objects, components, data structures, procedures, modules, functions, etc., that perform particular functions or implement particular abstract data types. A person skilled in the art will readily recognize that steps of the method can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of the described method 200.

The order in which the method 200 is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the methods can be implemented in any suitable hardware, software, firmware, or combination thereof. It will be understood that even though the method 200 is described with reference to the system 102, the description may be extended to other systems as well. For the sake of brevity, the method steps are not explained in detail and therefore, can be read in conjunction with the description of FIG. 1.

At block 202, a plurality of user stories associated with a software may be obtained for size estimation analysis. In one implementation, the base size estimation module 120 of the agile estimation system 102 may obtain the plurality of user stories.

At block 204, a base size may be computed for each of the plurality of user stories based on at least one basic parameter. The at least one basic parameter is indicative of a parameter affecting complexity associated with execution of a user story, and may include, but is not limited to business rules, code refactoring, regression, design change, deployment management change, number of entities manipulated, primary data manipulation type, database trips, number of interfaces, performance, security, usability, and reliability. In one implementation, the base size estimation module 120 of the agile estimation module 102 may compute the base size for each of the plurality of user stories.

At block 206, an additional size may be computed for the plurality of user stories based on at least one additional parameter. The at least one additional parameter is indicative of an environmental factor affecting delivery of an end product, i.e., the software, and may include, but is not limited to roadmap clarity, product backlog management, reporting requirements, external dependencies, large data handling, third party component usage, new technology, sprint duration strictness, research items, and configurations.

In one implementation, the ascertaining of the additional size may further include determining, against each additional parameter, whether the impact of each additional parameter is story-specific or sprint-specific. Further, an intermediate additional size for the plurality of user stories is determined against each additional parameter, depending on whether the impact of the respective additional parameter is story-specific or sprint-specific. Following this determination, the additional size for the plurality of user stories may be computed based on the intermediate additional size determined against each additional parameter. In one implementation, the additional size estimation module 122 of the agile estimation module 102 may determine the additional size for each of the plurality of user stories.

At block 208, an overall size of the plurality of user stories may be determined by consolidating the base size for each user story with the additional size for the plurality of user stories. In one implementation, the work allocation module 124 of the agile estimation module 102 may determine the overall size of each of the plurality of user stories.

At block 210, a total effort for execution of the plurality of user stories may be ascertained based on the base size for the each user story and the additional size for the plurality of user stories and based on pre-baselined delivery rates. A pre-baselined delivery rate is indicative of a quantitative measure of capability of a team for execution of a user story. In one implementation, the work allocation module 124 of the agile estimation module 102 may ascertain the consolidated effort for execution of the plurality of user stories.

At block 212, a total capacity of the team for a predefined sprint may be determined based on a number of members in the team, duration of the predefined sprint, and working hours per day. In one implementation, the work allocation module 124 of the agile estimation module 102 may determine the total capacity of the team.

At block 214, the plurality of user stories may be allocated to the team for execution, based on the total effort and the total capacity of the team. In one implementation, the work allocation module 124 of the agile estimation system 102 may allocate the plurality of user stories.

Although implementations of a method for size estimation of a plurality of user stories for agile software development have been described in language specific to structural features and/or methods, it is to be understood that the present subject matter is not necessarily limited to the specific features or methods described.

We claim:

1. A method for size estimation of a plurality of user stories used in one or more agile software development projects assigned to multiple teams, the method comprising:
    obtaining, by a processor, the plurality of user stories associated with a software for size estimation analysis;
    computing, by the processor, a base size for each of the plurality of user stories based on a basic parameter from a plurality of basic parameters assigned to each of the multiple teams, wherein the basic parameter comprises a pre-defined threshold value representing a characteristic contributing to complexity of each of the user stories, wherein computing the base size for each of the plurality of user stories comprises:
    providing a plurality of options for the at least one basic parameter for each of the plurality of user stories, wherein the plurality of options are choices selected for a user story, in response to a basic parameter, and wherein the plurality of options provided as both values and text vary for each basic parameter from the plurality of basic parameters;
    allocating a predefined score, based on selection of one of the plurality of options for the at least one basic parameter;
    determining an intermediate base size of each user story, by consolidating predefined scores for each of the user stories for the at least one basic parameter;
    determining a stringent base size and a comfortable base size for each user story, wherein the stringent base size is an integer identified in Fibonacci series that is closest to and smaller than the intermediate base size of a respective user story, and wherein the comfortable base size is an integer of Fibonacci series closest to and larger than the intermediate base size of the respective user story; and
    computing the base size of each user story as one of the stringent base size and the comfortable base size closer to the intermediate base size of the respective user story, wherein a notification is provided to a user, if the computed base size is larger than the predefined threshold value as an indication to break each of the user story into multiple user stories;
    ascertaining, by the processor, an additional size for the plurality of user stories based on at least one additional parameter, wherein the at least one additional parameter comprises an environmental factor affecting delivery of the software, wherein the additional size is indicative of a quantitative measure of complexity associated with delivery of the software impacting the execution of the plurality of user stories and wherein the ascertaining comprises:
    determining, by the processor, against each additional parameter, whether impact of the each additional parameter is story-specific or sprint-specific;
    determining, by the processor, received score as an intermediate additional size for the plurality of user stories against each additional parameter based on the user input score and depending on whether the impact of the respective additional parameter is story-specific or sprint-specific; and
    computing, by the processor, the additional size for the plurality of user stories based on the intermediate additional size determined against each additional parameter;
    determining, by the processor, an overall size of the plurality of user stories by consolidating the base size for and the additional size for each of the plurality of user stories corresponding to a predefined sprint for estimating a sprint velocity, wherein the sprint velocity is an estimation of number of story points delivered for each of the plurality of user stories in the predefined sprint, and wherein the overall size estimation is determined using a parametric analysis of the plurality of user stories by comparing the overall size of the plurality of user stories across sprints and one or more agile software development projects; and
    ascertaining, by the processor, a consolidated effort for execution of the plurality of user stories based on the estimated sprint velocity along with a pre-baselined delivery rate, wherein the pre-baselined delivery rate is a quantitative measure of capability of the team in terms of time required for execution of the user story, the pre-baselined delivery rate is measured in person hours per story point (PH/ISP), and varied according to a technology of a user story.

2. The method as claimed in claim 1 further comprising ascertaining the sprint velocity of the team based on an overall size of the plurality of user stories.

3. The method as claimed in claim 1 further comprises:
    receiving, by the processor, from a user, when it is determined that the impact of an additional parameter is story-specific, an input indicative of a percentage of user stories, out of the plurality of user stories, to be impacted by the additional parameter; and computing, by the processor, a score by which a total base size of the plurality of user stories is updated, wherein the score is computed based on the percentage of user stories to be impacted and a number of steps in Fibonacci series by which the base size of one user story is updated;

wherein the determining of the intermediate additional size for the plurality of user stories against the additional parameter is based on the computed score.

4. The method as claimed in claim 1 further comprises:

receiving, by the processor, from a user, when it is determined that the impact of an additional parameter is story-specific, an input indicative of known user stories that are impacted by the additional parameter;

computing, by the processor, a score by which the base size for each of the known user stories is updated, wherein the score is computed based on a number of steps in Fibonacci series by which the base size of one known user story is updated;

wherein the determining of the intermediate additional size for the plurality of user stories against the additional parameter is based on the computed score for the each known user story.

5. The method as claimed in claim 1 further comprises:

receiving, by the processor, from a user, when it is determined that the impact of an additional parameter is sprint-specific, a score by which a total base size for the plurality of user stories is updated;

wherein the determining of the intermediate additional size for the plurality of user stories against the additional parameter is based on the received score.

6. The method as claimed in claim 1, wherein the at least one basic parameter includes business rules, code refactoring, regression, design change, deployment management change, number of entities manipulated, primary data manipulation type, database trips, number of interfaces, performance, security, usability, and reliability.

7. The method as claimed in claim 1, wherein the at least one additional parameter includes roadmap clarity, product backlog management, reporting requirements, external dependencies, large data handling, third party component usage, new technology, sprint duration strictness, research items, and configurations.

8. An agile estimation system used in one or more agile software development projects assigned to multiple teams, the agile estimation system comprising:

a processor;

a base size estimation module, coupled to the processor to:

obtain the plurality of user stories associated with a software for size estimation analysis; and compute a base size for each of the plurality of user stories based on a basic parameter from a plurality of basic parameters assigned to each of the multiple teams, wherein the basic parameter comprises a pre-defined threshold value representing a characteristic contributing to complexity of each of the user stories, wherein computing the base size for each of the plurality of user stories comprises:

providing a plurality of options for the at least one basic parameter for each of the plurality of user stories, wherein the plurality of options are choices selected for a user story, in response to a basic parameter, and wherein the plurality of options provided as both values and text vary for each basic parameter from the plurality of basic parameters;

allocating a predefined score, based on selection of one of the plurality of options for the at least one basic parameter;

determining an intermediate base size of each user story, by consolidating predefined scores for each of the user stories for the at least one basic parameter;

determining a stringent base size and a comfortable base size for each user story, wherein the stringent base size is an integer identified in Fibonacci series that is closest to and smaller than the intermediate base size of a respective user story, and wherein the comfortable base size is an integer of Fibonacci series closest to and larger than the intermediate base size of the respective user story; and computing the base size of each user story as one of the stringent base size and the comfortable base size closer to the intermediate base size of the respective user story, wherein a notification is provided to a user, if the computed base size is larger than the predefined threshold value as an indication to break each of the user story into multiple user stories;

an additional size estimation module, coupled to the processor, to ascertain an additional size for the plurality of user stories based on at least one additional parameter, wherein the at least one additional parameter comprises an environmental factor affecting delivery of the software, wherein the additional size is indicative of a quantitative measure of complexity associated with delivery of the software impacting the execution of the plurality of user stories and wherein to ascertain the additional size, the additional size estimation module:

determines against each additional parameter, whether impact of the each additional parameter is story-specific or sprint-specific;

determines received score as an intermediate additional size for the plurality of user stories against each additional parameter based on the user input score and depending on whether the impact of the respective additional parameter is story-specific or sprint-specific; and computing the additional size for the plurality of user stories based on the intermediate additional size determined against each additional parameter;

a work allocation module, coupled to the processor, to determine an overall size of the plurality of user stories by consolidating the base size for and the additional size for each of the plurality of user stories corresponding to a predefined sprint for estimating a sprint velocity, and wherein the sprint velocity is an estimation of number of story points delivered for each of the plurality of user stories in the predefined sprint, wherein the overall size estimation is determined using a parametric analysis of the plurality of user stories by comparing the overall size of the plurality of user stories across sprints and one or more agile software development projects; and ascertain, by the processor, a consolidated effort for execution of the plurality of user stories based on the estimated sprint velocity along with a pre-baselined delivery rate, wherein the pre-baselined delivery rate is a quantitative measure of capability of the team in terms of time required for execution of the user story, the pre-baselined delivery rate is measured in person hours per story point (PH/ISP), and varied according to a technology of a user story.

9. The agile estimation system as claimed in claim 8, wherein the base size estimation module is coupled to the processor to,
provide, against each basic parameter, a plurality of options to a user for selection, wherein the plurality of options are indicative of choices to be opted for a user story with respect to the respective basic parameter;
allocate a predefined score, based on the selection of one of the plurality of options for the each basic parameter; and
determine an intermediate base size of each user story, by consolidating predefined scores allocated to the respective user story for basic parameters.

10. The agile estimation system as claimed in claim 8, wherein the work allocation module is coupled to the processor to ascertain the sprint velocity of the team based on an overall size of the plurality of user stories.

11. The agile estimation system as claimed in claim 8, wherein the additional size estimation module is coupled to the processor to,
receive, from a user, when it is determined that the impact of an additional parameter is story-specific, an input indicative of a percentage of user stories, out of the plurality of user stories, to be impacted by the additional parameter; and
compute a score by which a total base size of the plurality of user stories is updated, wherein the score is computed based on the percentage of user stories to be impacted and a number of steps in Fibonacci series by which the base size of one user story is updated;
wherein the intermediate additional size for the plurality of user stories is determined against the additional parameter based on the computed score.

12. The agile estimation system as claimed in claim 8, wherein the additional size estimation module is coupled to the processor to,
receive, from a user, when it is determined that the impact of an additional parameter is sprint-specific, a score by which a total base size for the plurality of user stories is updated;
wherein the intermediate additional size for the plurality of user stories is determined against the additional parameter based on the received score.

13. The agile estimation system as claimed in claim 8, wherein the work allocation module is coupled to the processor to,
ascertain a total effort for the plurality of user stories based on the base size for each user story and the additional size for the plurality of user stories and based on the pre-baselined delivery rates;
determine a total capacity of a team for a predefined sprint, wherein the total capacity is determined based on a number of members in the team, duration of the predefined sprint, and working hours per day; and
determine a capacity utilization of the team based on a ratio of the total effort for the plurality of user stories and the total capacity of the team.

14. The agile estimation system as claimed in claim 8, wherein the at least basic parameter includes business rules, code refactoring, regression, design change, deployment management change, number of entities manipulated, primary data manipulation type, database trips, number of interfaces, performance, security, usability, and reliability.

15. A non-transitory computer-readable medium having embodied thereon a computer program for executing a method comprising:
obtaining, by a processor, the plurality of user stories associated with a software for size estimation analysis;
computing, by the processor, a base size for each of the plurality of user stories based on a basic parameter from a plurality of basic parameters assigned to each of the multiple teams, wherein the basic parameter comprises a pre-defined threshold value representing a characteristic contributing to complexity of each of the user stories, wherein computing the base size for each of the plurality of user stories comprises:
providing a plurality of options for the at least one basic parameter for each of the plurality of user stories, wherein the plurality of options are choices selected for a user story, in response to a basic parameter, and wherein the plurality of options provided as both values and text vary for each basic parameter from the plurality of basic parameters;
allocating a predefined score, based on selection of one of the plurality of options for the at least one basic parameter;
determining an intermediate base size of each user story, by consolidating predefined scores for each of the user stories for the at least one basic parameter;
determining a stringent base size and a comfortable base size for each user story, wherein the stringent base size is an integer identified in Fibonacci series that is closest to and smaller than the intermediate base size of a respective user story, and wherein the comfortable base size is an integer of Fibonacci series closest to and larger than the intermediate base size of the respective user story; and
computing the base size of each user story as one of the stringent base size and the comfortable base size closer to the intermediate base size of the respective user story, wherein a notification is provided to a user, if the computed base size is larger than the predefined threshold value as an indication to break of the each of the user story into multiple user stories;
ascertaining, by the processor, an additional size for the plurality of user stories based on at least one additional parameter, wherein the at least one additional parameter comprises environmental factor affecting delivery of the software, wherein the additional size is indicative of a quantitative measure of complexity associated with delivery of the software impacting the execution of the plurality of user stories and wherein the ascertaining comprises:
determining, by the processor, against each additional parameter, whether the impact of the each additional parameter is story-specific or sprint-specific;
determining, by the processor, received score as an intermediate additional size for the plurality of user stories against each additional parameter based on the user input score and depending on whether the impact of the respective additional parameter is story-specific or sprint-specific; and
computing, by the processor, the additional size for the plurality of user stories based on the intermediate additional size determined against each additional parameter;
determining, by the processor, an overall size of the plurality of user stories by consolidating the base size for and the additional size for each of the plurality of user stories corresponding to a predefined sprint for estimating a sprint velocity, and wherein the sprint velocity is an estimation of number of story points delivered for each of the plurality of user stories in the predefined sprint, and wherein the overall size estimation is determined using a parametric analysis of the plurality of user stories by comparing the overall size of the plurality of user stories across sprints and one or more agile software development projects; and ascertaining, by the processor, a consolidated effort for execution of the plurality of user stories based on the estimated sprint velocity along with a pre-baselined delivery rate, wherein the pre-baselined delivery rate is a quantitative measure of capability of the team in terms of time required for execution of the user story, the pre-baselined delivery rate is measured in person hours per story point (PH/ISP), and varied according to a technology of a user story.

* * * * *